(12) United States Patent
Chrisman

(10) Patent No.: US 10,685,665 B2
(45) Date of Patent: Jun. 16, 2020

(54) METHOD AND APPARATUS TO IMPROVE SPEECH RECOGNITION IN A HIGH AUDIO NOISE ENVIRONMENT

(71) Applicant: Vocollect, Inc., Pittsburgh, PA (US)

(72) Inventor: Eric Chrisman, Marion, IA (US)

(73) Assignee: Vocollect, Inc., Pittsburgh, PA (US)

( * ) Notice: Subject to any disclaimer, the term of this patent is extended or adjusted under 35 U.S.C. 154(b) by 506 days.

(21) Appl. No.: 15/238,769

(22) Filed: Aug. 17, 2016

(65) Prior Publication Data

US 2018/0053518 A1     Feb. 22, 2018

(51) Int. Cl.
| | |
|---|---|
| *G10L 21/00* | (2013.01) |
| *G10L 21/0232* | (2013.01) |
| *G10L 25/21* | (2013.01) |
| *G10L 25/84* | (2013.01) |
| *G10L 21/02* | (2013.01) |
| *G10L 21/0216* | (2013.01) |

(52) U.S. Cl.
CPC .......... *G10L 21/0232* (2013.01); *G10L 25/21* (2013.01); *G10L 25/84* (2013.01); *G10L 2021/02163* (2013.01)

(58) Field of Classification Search
CPC ..... G10L 21/0232; G10L 25/21; G10L 25/84; G10L 2021/02163
USPC ................................................. 704/226, 233
See application file for complete search history.

(56) References Cited

U.S. PATENT DOCUMENTS

| | | |
|---|---|---|
| 6,832,725 B2 | 12/2004 | Gardiner et al. |
| 7,128,266 B2 | 10/2006 | Zhu et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,285,344 B2 | 10/2012 | Kahn et al. |
| 8,294,969 B2 | 10/2012 | Plesko |
| 8,317,105 B2 | 11/2012 | Kotlarsky et al. |

(Continued)

FOREIGN PATENT DOCUMENTS

| | | |
|---|---|---|
| WO | 2013163789 A1 | 11/2013 |
| WO | 2013173985 A1 | 11/2013 |

(Continued)

OTHER PUBLICATIONS

U.S. Appl. No. 13/367,978, filed Feb. 7, 2012, (Feng et al.); now abandoned.

(Continued)

*Primary Examiner* — Thierry L Pham
(74) *Attorney, Agent, or Firm* — Alston & Bird LLP

(57) ABSTRACT

A method improves speech recognition using a device located in proximity to a machine emitting high levels of audio noise. The microphone of the device receives the audio noise emitted by the machine and the speech emitted by a user and generates a composite signal. The device also receives a wireless communication signal from the machine comprising information on an audio noise profile and the proximity of the machine relative to the device. The audio noise profile is a representation of the audio noise emitted by the machine. Based on this information, the device determines a filter for filtering the composite signal to mitigate the audio noise before initiating the speech recognition process. The method improves speech recognition in a high audio noise environment.

20 Claims, 7 Drawing Sheets

(56) References Cited

U.S. PATENT DOCUMENTS

| | | |
|---|---|---|
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |

(56) References Cited

U.S. PATENT DOCUMENTS

| | | |
|---|---|---|
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2004/0213419 A1* | 10/2004 | Varma .................... 381/92 |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0265880 A1 | 10/2010 | Rautiola et al. |
| 2010/0306711 A1 | 12/2010 | Kahn et al. |
| 2011/0166856 A1 | 7/2011 | Lindahl et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |

(56) References Cited

U.S. PATENT DOCUMENTS

| | | |
|---|---|---|
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0270196 A1 | 9/2014 | Braho et al. |
| 2014/0270229 A1 | 9/2014 | Braho |
| 2014/0278387 A1 | 9/2014 | DiGregorio |
| 2014/0278391 A1 | 9/2014 | Braho et al. |
| 2014/0278392 A1 | 9/2014 | Ramabadran et al. |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0296294 A1* | 10/2015 | Paquier ............... G10L 21/0216 381/71.1 |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |

(56) References Cited

U.S. PATENT DOCUMENTS

| | | | |
|---|---|---|---|
| 2016/0189087 | A1 | 6/2016 | Morton et al. |
| 2016/0125873 | A1 | 7/2016 | Braho et al. |
| 2016/0227912 | A1 | 8/2016 | Oberpriller et al. |
| 2016/0232891 | A1 | 8/2016 | Pecorari |
| 2016/0292477 | A1 | 10/2016 | Bidwell |
| 2016/0294779 | A1 | 10/2016 | Yeakley et al. |
| 2016/0306769 | A1 | 10/2016 | Kohtz et al. |
| 2016/0314276 | A1 | 10/2016 | Sewell et al. |
| 2016/0314294 | A1 | 10/2016 | Kubler et al. |

FOREIGN PATENT DOCUMENTS

| | | |
|---|---|---|
| WO | 2014019130 A1 | 2/2014 |
| WO | 2014110495 A1 | 7/2014 |
| WO | 2014143491 A1 | 9/2014 |

OTHER PUBLICATIONS

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

U.S. Patent Application for a Laser Scanning Module Employing an Elastomeric U-Hinge Based Laser Scanning Assembly, dated Feb. 7, 2012 (Feng et al.), U.S. Appl. No. 13/367,978.

U.S. Patent Application for Indicia Reader filed Apr. 1, 2015 (Huck), U.S. Appl. No. 14/676,109.

\* cited by examiner

METHOD AND APPARATUS TO IMPROVE SPEECH RECOGNITION IN A HIGH AUDIO NOISE ENVIRONMENT

FIELD OF THE INVENTION

The present invention relates to improvements in speech recognition. More particularly, the present invention relates to a mobile device attempting to perform speech recognition in an audio noisy environment.

BACKGROUND

Generally speaking, in environments where mobile devices are performing speech recognition, many factors in the environment can negatively impact speech recognition performance. For example, when mobile devices are utilized in an environment where industrial machinery emits audio noise, the ability of the mobile device to perform accurate speech recognition can vary depending upon the user's proximity to audio noise sources and the characteristics of the audio noise.

Therefore, a need exists for a mechanism to cope with variable sources of audio noise that may interfere with accurate speech recognition.

SUMMARY

Accordingly, in one aspect, the present invention embraces a device that provides improvements in speech recognition in a high noise environment by intelligently filtering the received audio that comprises audio noise generated by a machine and speech emitted by a user.

In an exemplary embodiment, a method comprises receiving audio via a microphone of a device, wherein the audio comprises speech emitted from a user and audio noise emitted by a machine. The method further comprises receiving a wireless communication signal from the machine, determining an audio noise profile from the wireless communication signal or a database, and determining proximity of the device relative to the machine using location information extracted from the wireless communication signal.

In another aspect, the method further comprises generating a new audio noise profile based on a unique identifier and the audio noise emitted by the machine in a recording profile mode, if the wireless communication signal comprises the unique identifier of the machine, wherein the new audio noise profile is transmitted to the machine and/or the new audio noise profile is stored in the database, and wherein, in the recording profile mode, one or more audio noise profiles are generated automatically.

In another aspect, the method further comprises determining the location information of the machine by measuring an output power level of the wireless communication signal at an output of the machine. Moreover, the method further comprises determining the proximity of the machine relative to the device by comparing an output power level of the wireless communication signal measured at the machine to a received power level of the wireless communication signal measured at the device.

In another aspect, the method further comprises performing speech recognition processes without filtering the composite audio signal, if the device fails to detect the wireless communication signal transmitted from the machine, or if the device fails to receive audio noise emitted by the machine, or if the wireless communication signal fails to include location information. Moreover, the method further comprises determining characteristics of a filter based, in part, on collective audio noise profiles of the audio noise emitted by the plurality of machines and proximity of each machine of the plurality of machines relative to the device, if a plurality of machines is within a defined proximity of the device. The machine and/or device may be mobile apparatuses.

In another exemplary embodiment, a method comprises determining an audio noise profile from a wireless communication signal or a database, determining proximity of a device relative to a machine using location information extracted from the wireless communication signal, determining a filter based on the audio noise profile and proximity of the device relative to the machine, and filtering the audio utilizing the filter. Then the method comprises performing speech recognition processes to the filtered audio. The method further comprises performing speech recognition processing without filtering the received audio if the device fails to receive the wireless communication signal from the machine, or if the device fails to detect audio noise emitted by the machine, or if the wireless communication signal fails to include location information.

In another aspect, the method further comprises generating a new audio noise profile based on a unique identifier and the audio noise emitted by the machine in a recording profile mode if the wireless communication signal comprises a unique identifier of the machine. The wireless communication signal may be a Bluetooth Low-Energy beacon.

In yet another exemplary embodiment, a method comprises determining an audio noise profile from a wireless communication signal or a database, determining proximity of a device relative to a machine using location information extracted from the wireless communication signal and retrieving the audio noise profile from the database in order to determine a filter, if the device, which is in an operation mode for listening for speech and a machine identification (ID), identifies in the database the audio noise profile associated with the machine ID, wherein the machine identification (ID) is obtained from the wireless communication signal.

In another aspect, the method further comprises generating a new audio noise profile based on the machine ID and the audio noise received from the machine, if the device is in an operation mode for recording profiles and the wireless communication signal includes a machine identification (ID). Wherein the generated new audio noise profile is transmitted to the machine and/or the new audio noise profile is stored in the database, and wherein in the operation mode for recording profiles, one or more audio noise profiles are generated automatically.

In another aspect, according to the method, if the wireless communication signal comprises a machine identification (ID) and a first audio noise profile, and if the device stores a second audio noise profile associated with the machine ID in the database, then the method comprises selecting the first audio noise profile or the second audio noise profile to determine the filter based in part on a latest timestamp of the respective profiles, and if the device does not store a second audio noise profile associated with the machine ID in the database, then the method comprises selecting the first profile to determine the filter.

In another aspect, according to the method, if a plurality of machines is within a defined proximity of the device, the method comprises determining characteristics of the filter based, in part, on collective audio noise profiles of the audio noise emitted by the plurality of machines and proximity of each machine of the plurality of machines relative to the device.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1A:
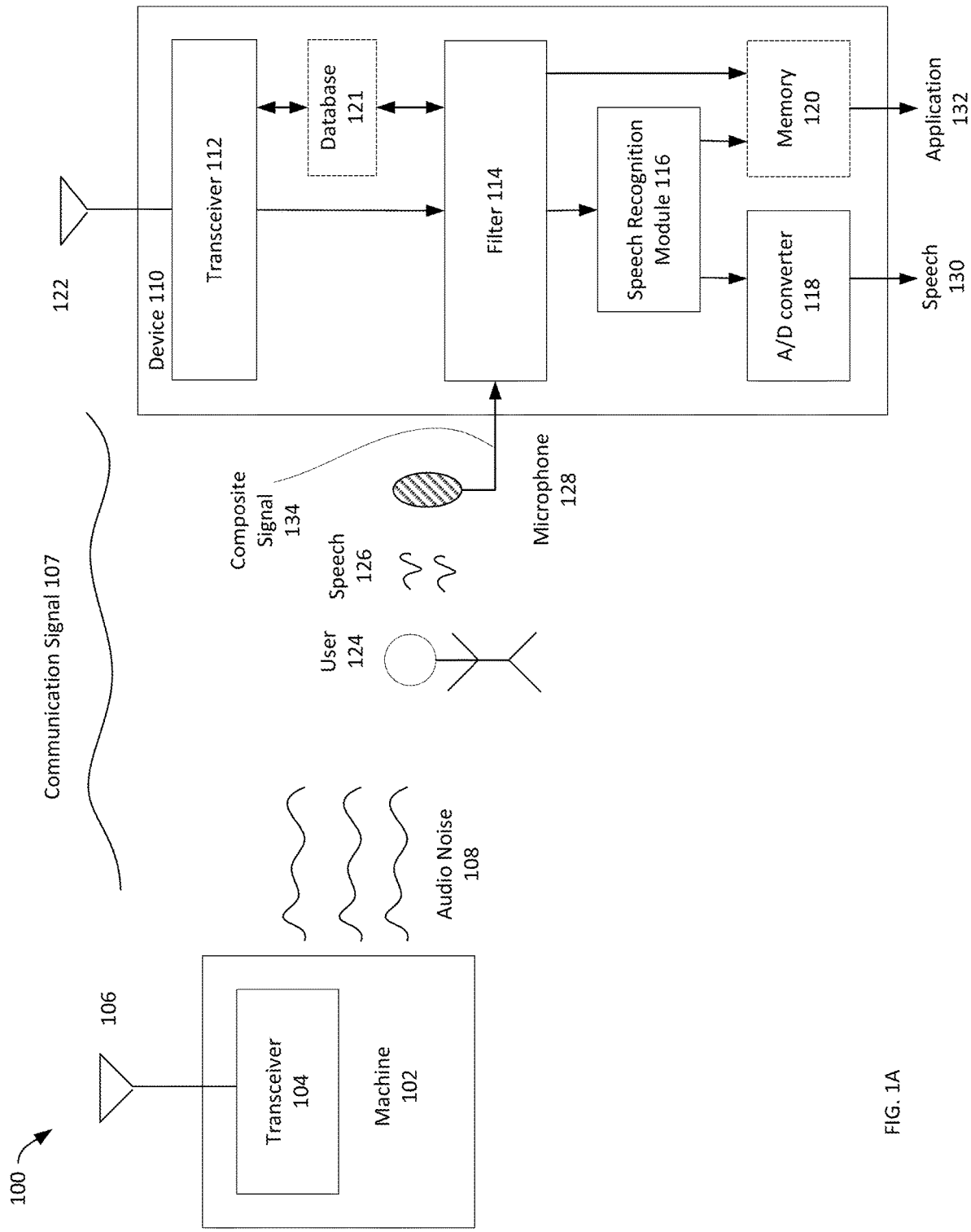
FIG. 1A depicts an exemplary embodiment with a machine communicating with a device in a noisy environment.

The present invention embraces apparatus and methods for improving speech recognition in a noisy audio environment. A typical application may be an industrial environment comprising machines that emit audio noise that make it difficult for a user to accurately communicate voice messages via a mobile device. The user in this environment may speak into the mobile device. The mobile device may receive the user speech and the audio noise emitted by the machines. Processors in the mobile device may be challenged to accurately perform speech recognition of the user's speech since the received audio may include the user speech and the audio noise emitted by the machines.

Another application may be a radio operating in a non-industrial environment. Similarly to the aforementioned example, when a user of a mobile device attempts to speak into the mobile device, the processors in the mobile device may be challenged to accurately perform speech recognition of the user's speech since the received audio may include the user speech and the audio emitted by the radio.

Another application may be a user of a mobile device located in a vehicle. The vehicle emits noise that may vary with the speed of the vehicle. The speech recognition processor of the mobile device may be challenged to recognize the user speech in this environment with varying noise from the vehicle.

The present invention may be based on intelligent filtering of the recorded audio such that the audio noise from the machine(s) is filtered by the mobile device before implementing speech recognition processing. The audio noise from each machine may be characterized by an audio noise profile. The audio noise profile is utilized to implement the intelligent filtering.

The present invention may require two-way communications between the machine and the mobile device. Current advances in low energy communication technologies may allow efficient solutions for the present invention. These technologies offer improvements to support communication methods in mobile environments.

Some of emerging wireless low energy communication technologies includes Bluetooth Low-Energy (BLE) or Smart Bluetooth, ANT or ANT+, ZigBee, Z-Wave, and DASH7. Bluetooth Low-Energy is a wireless personal area network technology designed and marketed by the Bluetooth Special Interest Group aimed at novel applications in the healthcare, fitness, beacons, security, and home entertainment industries.

Compared to Classic Bluetooth, BLE is intended to provide a considerable reduction in power consumption and cost while maintaining a comparable communication range. These features are attractive in implementing the present invention.

An implementation of BLE technology is sometimes referred to as a BLE beacon. A protocol utilized with wireless low energy communication technologies is iBeacon which was developed by Apple, Inc. iBeacon compatible hardware transmitters, typically called beacons, are a class of Bluetooth Low-Energy (LE) devices that broadcast their identifier to nearby portable electronic devices. The technology enables smartphones, tablets, and other devices to perform actions when in close proximity to an iBeacon.

The term iBeacon and Beacon are often used interchangeably. iBeacon allows Mobile Apps (running on both iOS and Android devices) to listen for signals from beacons in the physical world and react accordingly. In essence, iBeacon technology allows Mobile Apps to understand their position on a micro-local scale, and deliver hyper-contextual content to users based on location. An iBeacon deployment consists of one or more iBeacon devices that transmit their own unique identification number to the local area. Software on a receiving device may then look up the iBeacon and perform various functions, such as notifying the user.

iBeacon differs from some other communication and location-based technologies as the broadcasting device (beacon) is only a 1-way transmitter to the receiving smartphone or receiving device, and necessitates a specific app installed on the device to interact with the beacons. Some of the features of the present invention may only require a 1-way transmitter. Other features of the present invention may require a 2-way transceiver.

In an exemplary embodiment, FIG. 1 depicts a network 100 comprising machine 102 that communicates with device 110 in a noisy audio environment. Typically, machine 102 may be any mechanical or electrical device that transmits or modifies energy to perform or assist in the performance of human tasks.

When operating, machine 102 emits and audio noise 108. Machine 102 may generate audio noise 108 having a variety of attributes. Audio noise 108 may be characterized with random attributes. Alternative, audio noise 108 may be characterized by a consistent audio tone, volume, and pattern such that the audio noise of machine 102 may be profiled. An audio noise profile may allow a receiving device such as device 110 to intelligently filter out audio noise 108.

Machine 102 also comprises transceiver 104. Transceiver 104 may be a wireless transceiver coupled to antenna 106. Transceiver 104 may comprise a wireless low energy beacon such as a BLE beacon that may broadcast via antenna 106 to one or more devices in an area. The broadcast pattern may be omni-directional. For some applications, transceiver 104 may only comprise a transmitter. For other applications, transceiver 104 may comprise a transmitter and a receiver.

FIG. 1 illustrates machine 102 wirelessly communicating with device 110 via communication signal 107. Communication signal 107 may be a wireless signal. Communication signal 107 may comprise an audio noise profile for audio noise 108 and a machine ID for machine 102. However, one skilled in the art may recognize that machine 102 may communicate with device 110 on a non-wireless basis via a type of wired communication.

Machine 102 and device 110 may be stationary or mobile apparatuses. Typically, device 110 may be a mobile device operating in an industrial environment. Machine 102 may be operational only part of the time, for example operating intermittently or periodically. The characteristics of the audio noise, i.e., audio noise profile, may vary depending on the specific operation conditions or state. For example, the audio noise may vary by frequency, volume, and/or periodicity. Audio noise 108 may only be present when machine 102 is operational.

Transceiver 104 may be powered by machine 102 and may not require separate batteries or battery replacement. Typically, device 110, as mobile device, requires batteries for operation.

Device 110 may comprise microphone 128. In network 100, user 124 may communicate an audio message (speech 126) that is subsequently received by microphone 128. Additionally, microphone 128 receives audio noise 108 that was emitted by machine 102. Accordingly, a composite signal 134 comprising speech 126 and audio noise 108 may be generated. The composite signal 134 inputs to filter 114.

Device 110 comprises antenna 122 that may be coupled to transceiver 112. Transceiver 112 sends and receives signals from device 110 to machine 102. For some applications, transceiver 112 may only comprise a receiver. For other applications, transceiver 112 may comprise a transmitter and a receiver.

Device 110 also may comprise filter 114. Filter 114 may be coupled to transceiver 112, microphone 128, speech recognition module 116, database 121, and memory 120. Filter 114 may filter composite signal 134 to extract audio noise 108. The characteristics of the filter may be based, in part, on an audio noise profile of the audio noise emitted by the machine and proximity of the machine relative to the device. The audio noise profile may be extracted from communication signal 107 received from machine 102. Alternative, device 110, when operating in a listening mode, may utilize the machine ID for machine 102 to determine whether database 121 includes an audio noise profile associated with this machine ID. Database 121 may be a component of device 110, or the audio noise profile and associated machine ID information may be transferred and stored in another device in network 100.

If device is operating in a recording profile mode, and if the communication signal 107 comprises the unique identifier of machine 102, device 110 may process the unique identifier of machine 102 and the received audio noise 108 to generate a new audio noise profile. Subsequently, device 110 transmits this audio noise profile to machine 102 and/or stores this audio noise profile in database 121. This audio noise profile is then available for later use and distribution to other devices. The unique identifier may comprise information on the state of machine 102. Audio noise profiles may be automatically generated in the recording profile mode.

Machine 102 may generate the audio noise profile based on audio noise 108. Alternatively, the audio noise profile may be generated by a third device based on reception of the unique identifier of machine 102 and reception of audio noise 108.

The proximity of machine 102 relative to device 110 may be determined based on location information extracted from communication signal 107. The location information of the machine may comprise an output power level, or signal strength, of communication signal 107 measured at antenna 106, that is, the output of machine 102. The proximity of machine 102 relative to device 110 may be determined by comparing the output power level (signal strength) of communication signal 107 at machine 102 to the received power level measured at the device 110. The received power level measured at the device 110 may be the received signal strength indicator (RSSI).

Filter 114 is coupled to a speech recognition module 116. Filter 114 intelligently filters the composite signal 134, and substantially extracts the audio noise 108 from the composite signal 134. Accordingly, the speech recognition module 116 may be able to accurately recognize speech 126 that was emitted from user 124.

As previously noted, audio noise 108 may only be present when machine 102 is operational. Also, when the machine is not operational, transceiver 104 may not generate communication signal 107. When filter 114 determines that audio noise 108 or that the communication signal 107 is not present, then filter 114 may not filter composite signal 134. Naturally, if the composite signal 134 does not comprise any audio noise 108, there is no reason to filter composite signal 134 before proceeding with the voice recognition process.

The speech recognition module 116 may be coupled to an analog to digital converter, A/D converter 118. A/D converter 118 generates speech 130 which is a replication of speech 126. Because of the intelligent filtering previously described, speech 130 may be a substantial replication of speech 126, i.e. the content of speech 126.

The speech recognition module 116 and filter 114 may be coupled to a memory 120. Memory 120 may be a component of device 110 or may be located in another device. Memory 120 may store a combination of the unique identifier of machine 102, an audio noise profile of machine 102 and the output of the speech recognition module 116. This stored information may be used in application 132. This stored information may also be transferred and stored in another device in network 100.

Figure 1B:
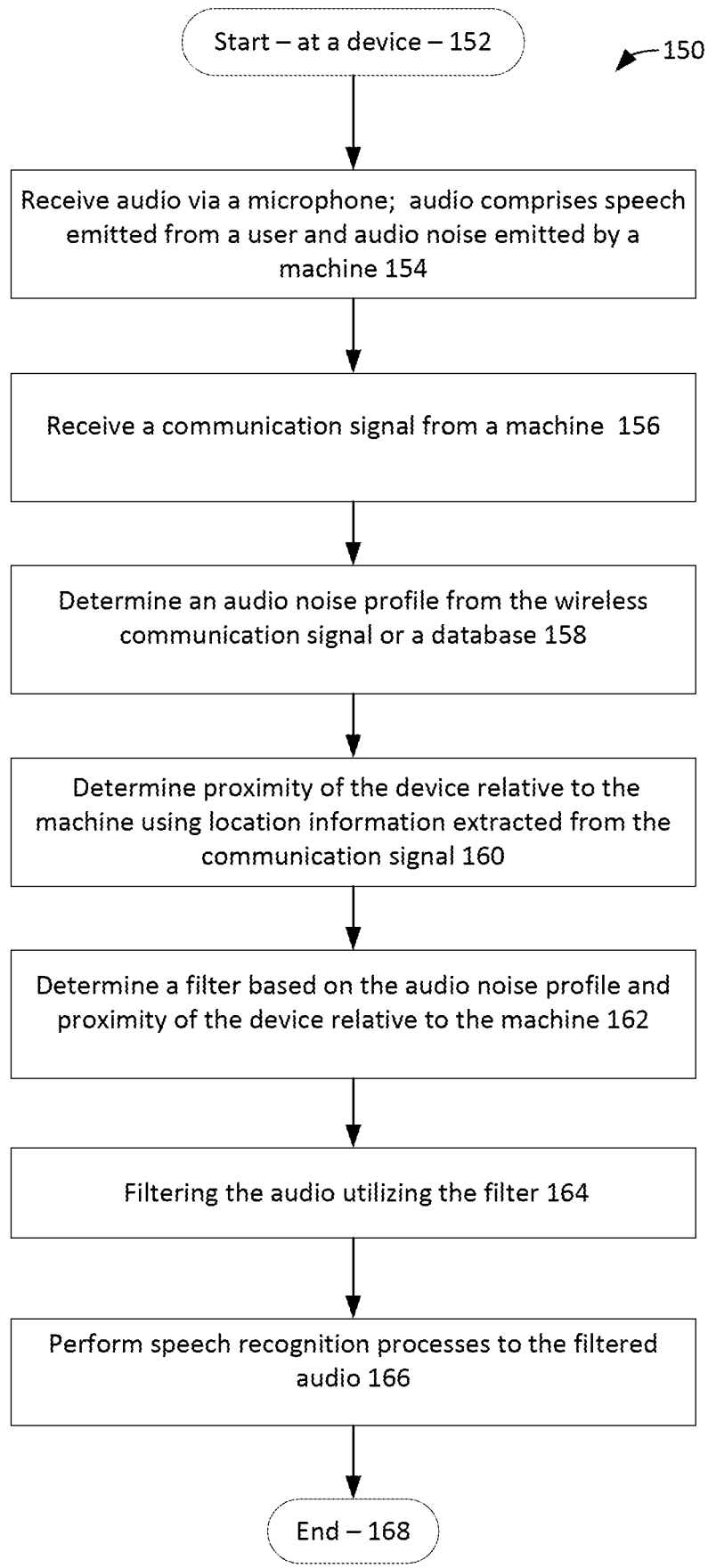
FIG. 1B depict a flowchart illustrating exemplary methods of improving speech recognition

In an exemplary embodiment, FIGS. 1B depicts flowchart 150 that illustrates methods of improving speech recognition. For flowchart 150, starting at step 152, device 110 receives audio via microphone 128 (step 154). The audio may be speech from a user 124 and/or audio noise 108 from machine 102. Device 110 receives communication signal 107 from machine 102 (step 156). Device 110 then determines an audio noise profile from the communication signal 107 or from a database (step 158). Additionally, device 110 determines the proximity of the device relative to the machine using location information extracted from communication signal 107 (step 160). With the audio profile and proximity, device 110 determines a filter 114 based on the audio noise profile and proximity of the device relative to the machine (step 162). Device 110 can then filter the audio (i.e. composite signal 134) utilizing filter 114 (step 164). Finally, device 110 performs speech recognition processes to the filtered audio (step 166).

Figure 2:
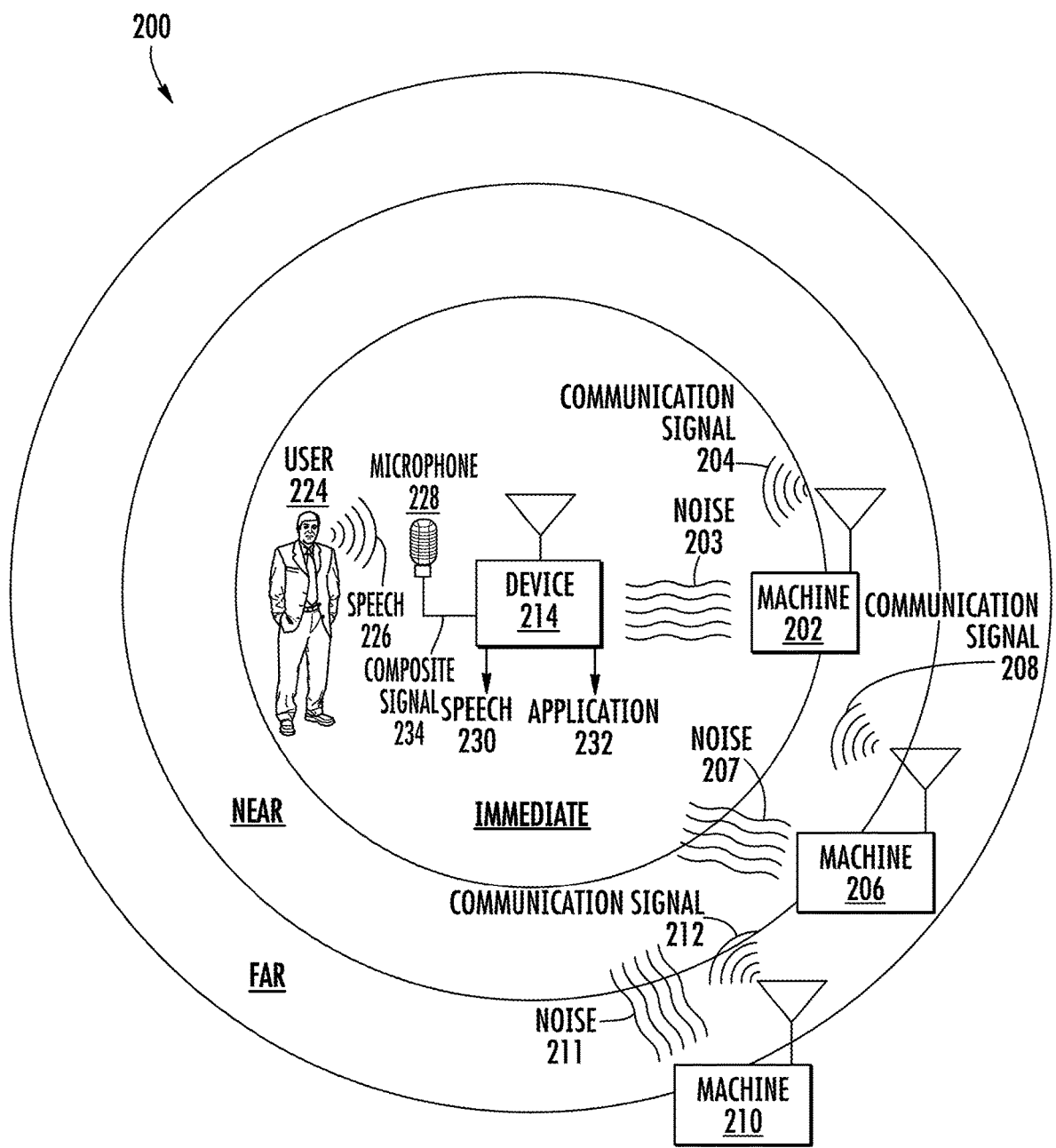
FIG. 2 depicts another exemplary embodiment with a plurality of machines communicating with a device in a noisy environment.

In an exemplary embodiment, FIG. 2 depicts a network 200 comprising with a plurality of machines communicating with device 214 in a noisy environment. The network may comprise three machines, machine 202, machine 206, and machine 210. Each of the machines may emit audio noise, noise 203, noise 207, and noise 211. Each machine may comprise a transceiver that transmits communication signal 204, communication signal 208, and communication signal 212. For some application, machines 202, 206 and 210 may only comprises a transmitter or a beacon. Device 214 includes equivalent functions as described for device 110 of FIG. 1. As illustrated, user 224 emits the speech 226 that is received by microphone 228. Microphone 228 also receives audio noise from the various machines. Microphone 228 generates composite signal 234 based on speech 226 and noise 203, 207, and 211. Device 214 has a device transceiver that receives communication signals 204, 208 and 212. The device transceiver has equivalent functionality as transceiver 112 of FIG. 1

Machines 202, 206 and 210 are located at different distances from device 214. As depicted, machine 202 is closest to device 214, or an "immediate" distance. Machine 206 is next closest to device 214, or a "near" distance. Machine 210 is furthest away from device 214, or a "far" distance. The value of immediate, near and far may vary depending on the transmitter technology. Bluetooth Low-Energy beacons may have a range of 150 meters.

The received audio noise (i.e. received noise 203, 207, 211) at device 214 may vary based on the distance between device 214 and the various machines. For example, the received audio noise at device 214 for noise 211 from machine 210 may be reduced proportionally more based on the "far" distance, as compared to the received audio noise at device 214 for noise 203 from machine 202 based on an "immediate" distance. Device 214 may intelligently adjust its internal filter (i.e. filter 114 in FIG. 1) based on the collective received audio noise and proximity of the various machines.

As an example, (1) noise 203 may be a high pitched tone. Device 214 may filter the received noise 203 by frequency based on the high pitch and by volume to adjust for the proximity of machine 202 relative to device 214. (2) Noise 207 may be a thumping noise that occurs every 3 seconds. Device 214 may filter the received noise 207 by frequency and periodicity based on the thumping noise and the 3 second period and by volume to adjust for the proximity of machine 206 relative to device 214. (3) Noise 211 may be a low pitch hum noise. Device 214 may filter the received noise 211 by frequency based on the hum noise and by volume to adjust for the proximity of machine 210 relative to device 214.

In this example, device 214 adjusts the filtering to address the characteristics of the noise and proximity described for the 3 machines in (1), (2) and (3). In summary, if a plurality of machines is within a defined proximity of the device, the device determines the characteristics of the filter based, in part, on collective audio noise profiles of the audio noise emitted by the plurality of machines and proximity of each machine of the plurality of machines relative to the device.

Figure 3:
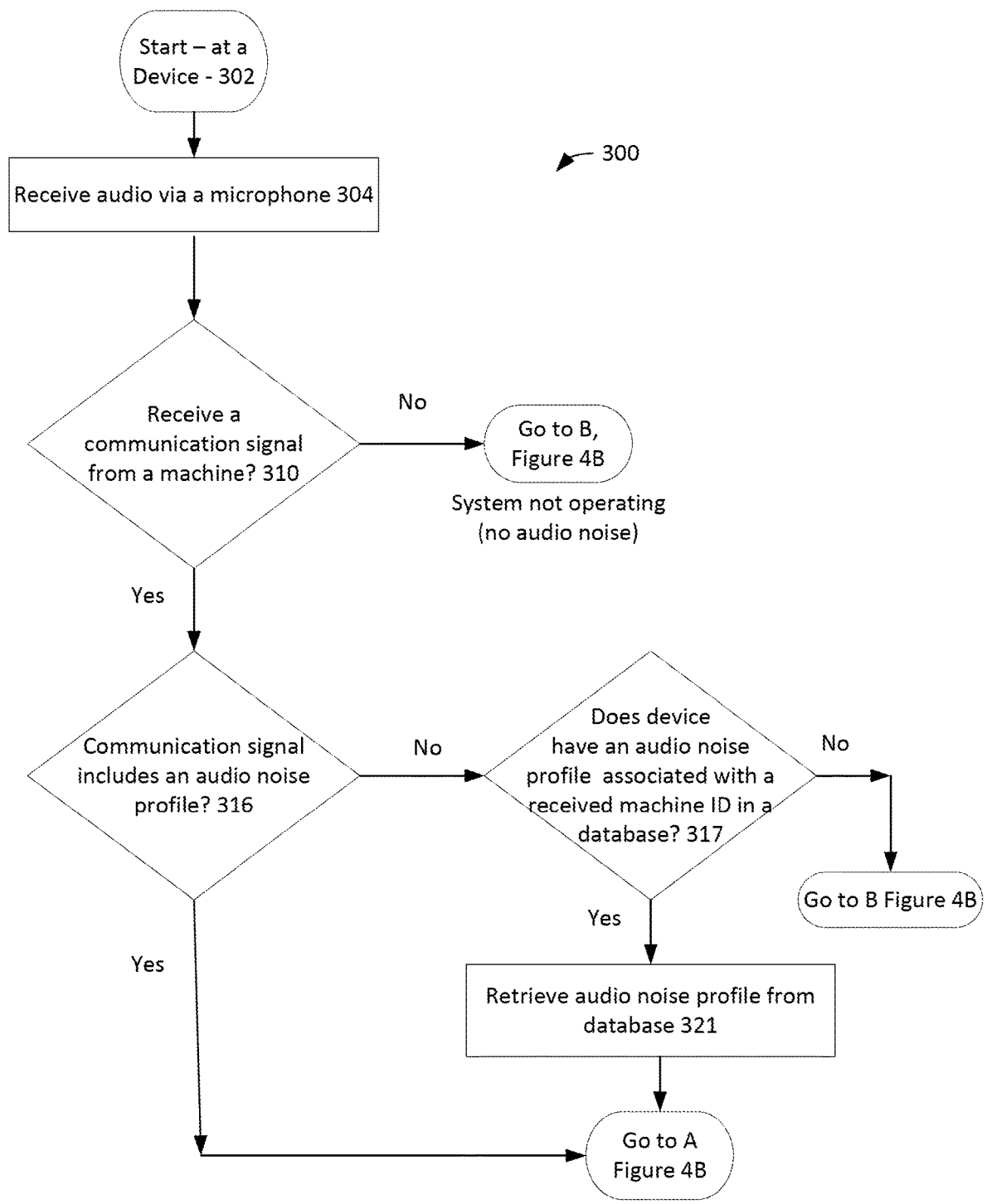
FIGS. 3, 4A, 4B, and 4C depict flowcharts illustrating other exemplary methods of improving speech recognition.
Figure 4A:
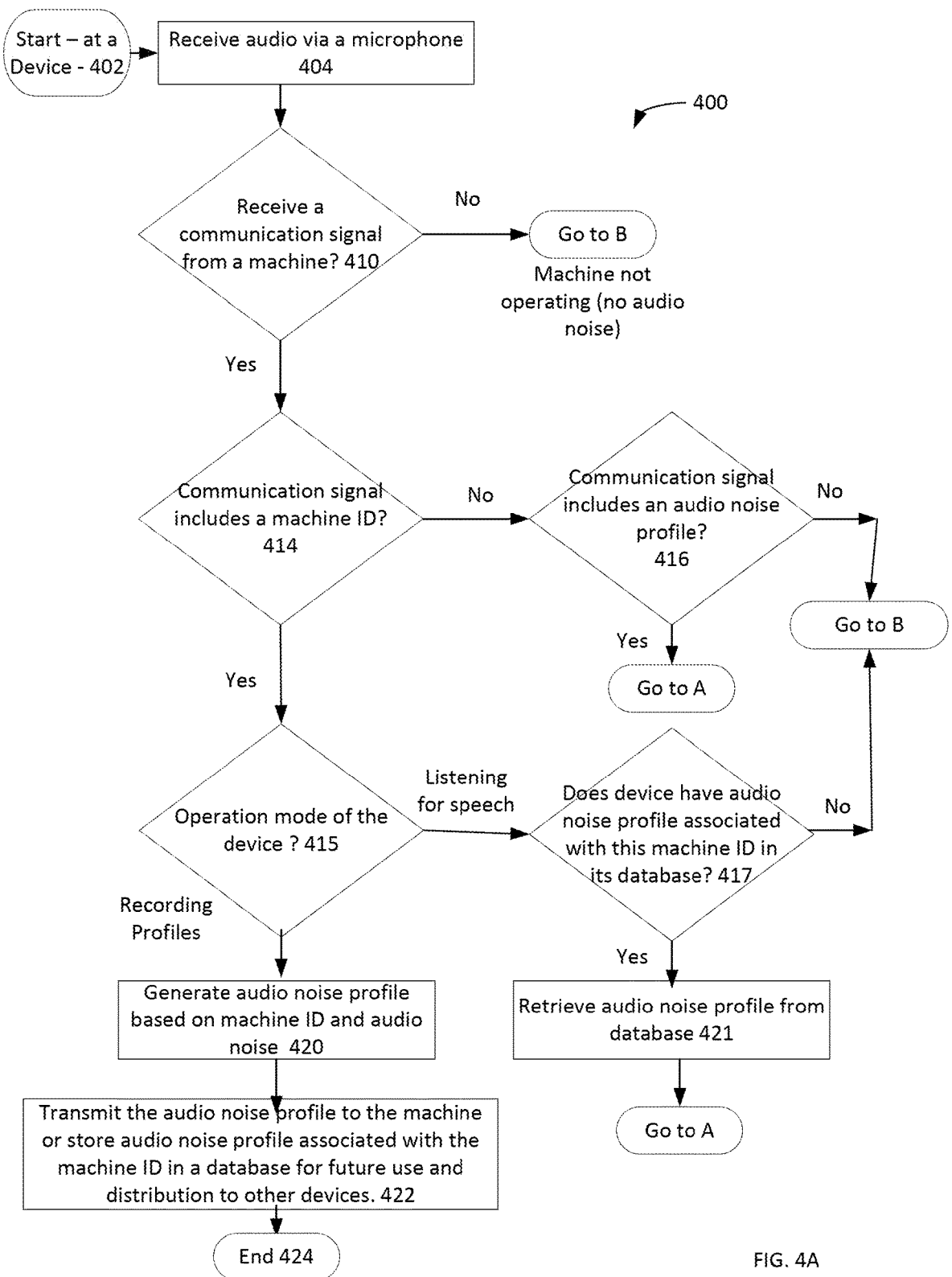
Figure 4B:
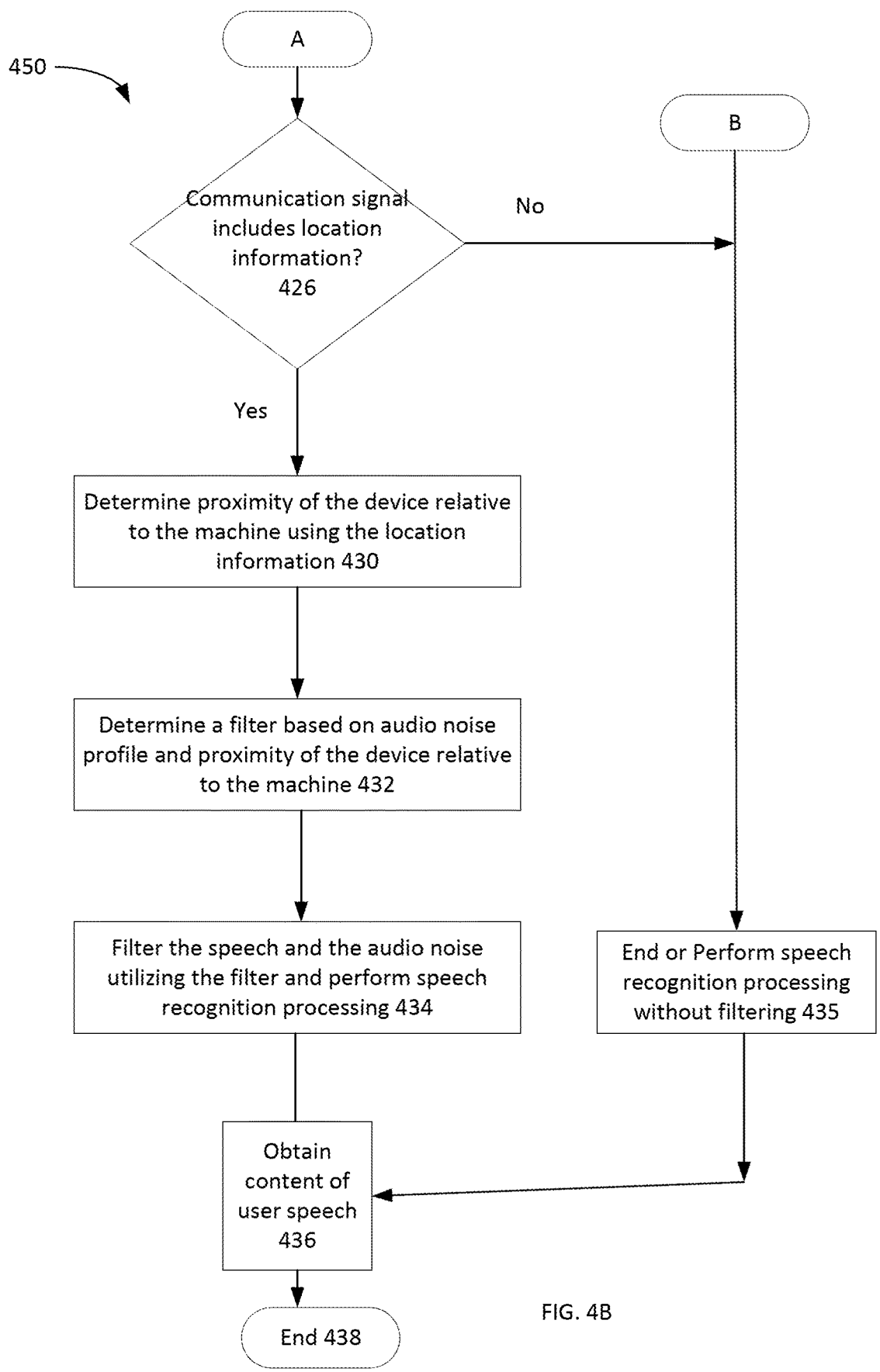

In an exemplary embodiment, FIGS. 3 and 4B depicts flowchart 300 and flowchart 450, respectively, illustrating a method of improving speech recognition. Starting at device 110 (step 302), device 110 receives audio via microphone 128 (step 304). The audio may be speech from a user and/or audio noise from machine 102. If device 110 receives communication signal 107 from machine 102 (step 310), and communication signal 107 includes an audio noise profile for audio noise 108 of machine 102 (step 316), the method proceed to flowchart 450 (FIG. 4B). If communication signal 107 includes location information (step 426) then device 110 determines the proximity of device 110 relative to machine 102 using the location information (step 430). Then, based on the audio noise profile and the determined proximity of device 110 relative to machine 102, determine filter 114 and perform speech recognition processing in speech recognition module 116 (step 432). Next, filter the speech 126 and the audio noise 108 utilizing filter 114 (step 434), resulting in a replication of speech 126, i.e. the content of speech 126 (step 436).

If device 110 fails in step 310 to receive communication signal 107 from machine 102, then device 110 either performs speech recognition processing without any filtering, or the process ends (step 435). If speech recognition processing is performed, a replication of speech 126 is obtained, i.e. the content of speech 126 (step 436)

If communication signal 107 from machine 102 fails to include location information (step 426), then device 110 either performs speech recognition processing without any filtering, or the process ends (step 435). If speech recognition processing is performed, a replication of speech 126 is obtained, i.e. the content of speech 126 (step 436).

If the communication signal 107 fails to include an audio noise profile in step 316, but device 110 has an audio noise profile associated with machine 102 in database 121(step 317), then the audio noise profile is retrieved from database 121 (step 321). The method proceeds to obtain a replication of speech 126 as previously described with steps 426, 430, 432, 435 and 436 (see flowchart 450, FIG. 4B).

If there is no audio noise profile associated with machine 102 in database 121(step 317), then device 110 either performs speech recognition processing without any filtering, or the process ends (step 435). If speech recognition processing is performed, a replication of speech 126 is obtained, i.e. the content of speech 126 (step 436).

In another exemplary embodiment, FIG. 4A and FIG. 4B depicts flowchart 400 and flowchart 450, respectively, illustrating another method of improving speech recognition. Starting at device 110 (step 402), device 110 receives audio via microphone 128 (step 404). The audio may be speech from a user and/or audio noise from machine 102. If device 110 receives communication signal 107 (step 410), and communication signal 107 includes a machine ID (step 414), then device 110 proceeds to determine the operation mode of device 110 (step 415). If the operation mode is "listening for speech" and if device 110 has an audio noise profile associated with this machine ID in its database 121 (step 417), then device 110 proceeds to retrieve the audio noise profile from database 121 (step 421). Then, the method proceeds to obtain a replication of speech 126 as previously described with steps 426, 430, 432, 435 and 436 (see flowchart 450, FIG. 4B).

If device 110 fails to receive communication signal 107 (step 410), then device 110 either performs speech recognition processing without any filtering, or the process ends (step 435). If speech recognition processing is performed, a replication of speech 126, i.e. the content of speech 126 is obtained (step 436)

If communication signal 107 fails to include a machine ID (step 414), but the communication signal 107 includes an audio noise profile (step 416), then the method proceeds the method proceeds to obtain a replication of speech 126 as previously described with steps 426, 430, 432, 435 and 436 (see flowchart 450, FIG. 4B).

If communication signal 107 fails to include a machine ID (step 414), and the communication signal 107 fails to include an audio noise profile (step 416), then device 110 either performs speech recognition processing without any filtering, or the process ends (step 435). If speech recognition processing is performed, a replication of speech 126, i.e. the content of speech 126 is obtained (step 436).

If device 110 receives communication signal 107 (step 410), and communication signal 107 includes a machine ID (step 414), then device 110 determines the operation mode of device 110 (step 415). If the operation mode is "recording profiles", device 110 proceeds to generate new audio noise profiles based on the machine ID and received audio noise (audio noise 108) (step 420). Audio noise profiles may be automatically generated in the recording profile mode.

Device 110 then proceeds to transmit the audio noise profile to machine 102 and/or store the audio noise profile associated with the machine ID for machine 102 in database 121. The audio noise profile can then be used in future processing or distribution to other devices (step 422). Transmission may be via a BLE signal or other communication method. The method ends at step 424.

Figure 4C:
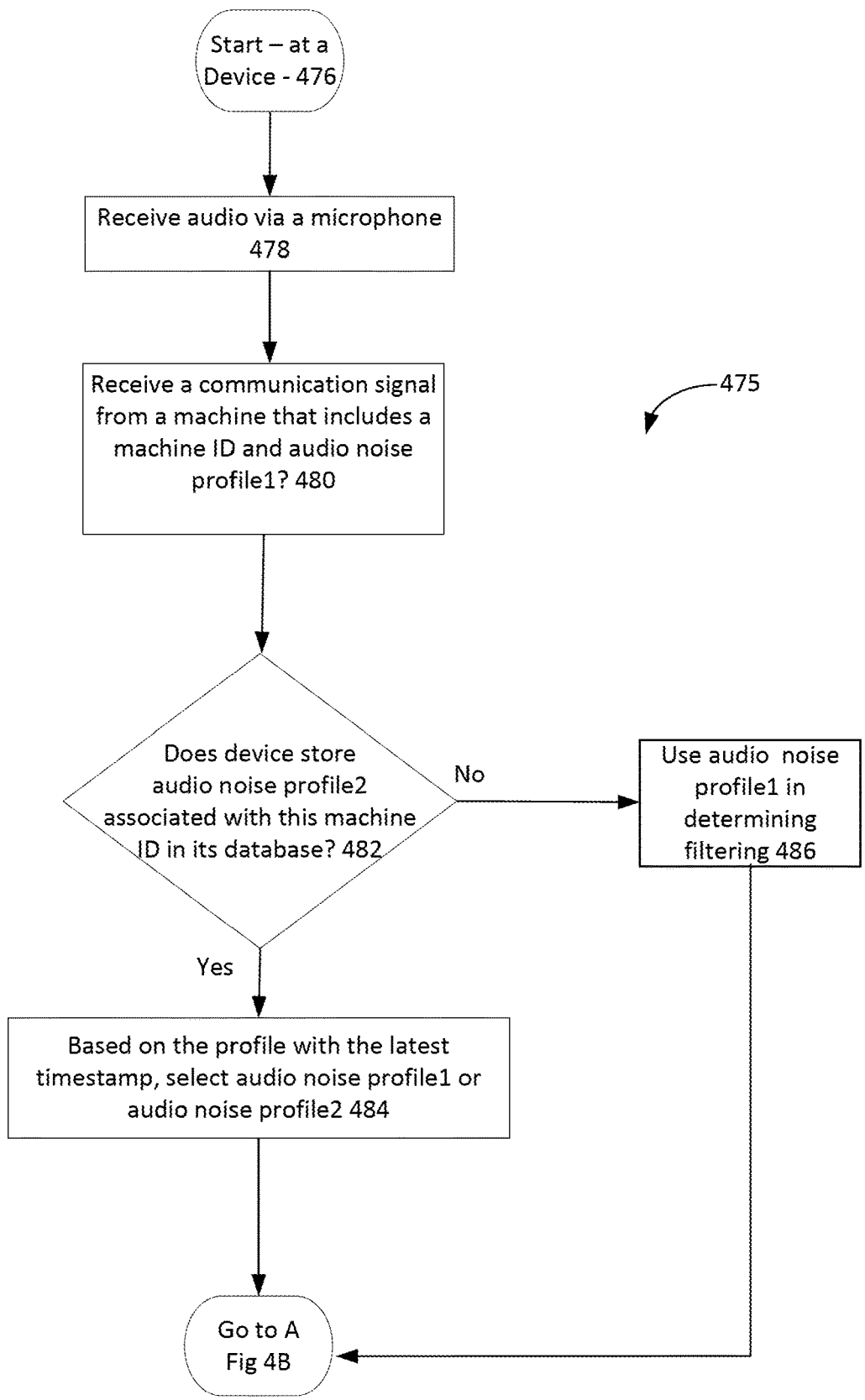

In another exemplary embodiment, FIG. 4B and FIG. 4C depicts flowchart 450 and flowchart 475 illustrating another method of improving speech recognition. Starting at device 110 (step 476), device 110 receives audio via microphone 128 (step 478). The audio may be speech from a user and/or audio noise from machine 102. Device 110 then receives communication signal 107 that includes a machine ID and a first audio noise profile (step 480). If device 110 stores in database 121 a second audio noise profile that is associated with the machine ID (step 482), then the first audio noise profile or the second audio noise profile is selected to determine the filter based in part on a latest time stamp of the respective profiles (step 484). If the device does not store a second audio noise profile associated with the machine ID in the database, then the first profile is selected to determine the filter (step 486). Per the aforementioned paragraphs, the present invention comprises several modes for operation. Some of the modes includes: (1) Communication signal includes machine ID only. Device determines if database has an associated audio noise profile that may be used to program the filter; (2) Communication signal includes audio noise profile only. This audio noise profile may be used to program the filter; (3) Communication signal includes machine ID and audio noise profile1. Device may determine if database has an associated audio noise profile2. If there is an audio noise profile2, then the device selects either profile1 or profile2, depending on which profile has the latest timestamp (date and time).

The following is a description of example embodiments.

Accordingly, in one aspect, the present invention embraces a device that provides improvements in speech recognition in a high noise environment by intelligently filtering the received audio that comprises audio noise generated by a machine and speech emitted by a user.

In an exemplary embodiment, the device comprises a transceiver that receives a wireless communication signal from a machine that generates significant audio noise, and a microphone that generates a composite audio signal of the audio noise emitted from the machine and speech emitted from a user. The device further comprises a filter that filters the composite audio signal to extract the audio noise emitted from the machine, and a speech recognition module that performs speech recognition processes on the filtered composite audio signal. Of significance, the characteristics of the filter are based, in part, on an audio noise profile of the audio noise emitted by the machine and the proximity of the machine relative to the device. The audio noise profile is extracted from the wireless communication signal or retrieved from a database. The proximity of the machine relative to the device is determined based on location information extracted from the wireless communication signal.

In another aspect, the location information of the machine may comprise an output power level of the wireless communication signal measured at the output of the machine, and the proximity of the machine relative to the device may be determined by comparing the wireless communication signal output power level measured at the machine to the wireless communication signal received power level measured at the device.

In another aspect, if the wireless communication signal comprises a unique identifier of the machine, the device, in a recording mode, generates a new audio noise profile based on the unique identifier and the audio noise emitted by the machine. The new audio noise profile is transmitted to the machine and/or stored in a database where it can be utilized in future processing. Further, in the recording profile mode, one or more audio noise profiles can be generated automatically.

In another aspect, if the device fails to detect the wireless communication signal transmitted from the machine, or fails to receive audio noise emitted by the machine, or if the wireless communication signal fails to include location information, speech recognition processes are performed without filtering the composite audio signal.

In another aspect, if a plurality of machines is within a defined proximity of the device, the device determines the characteristics of the filter based, in part, on collective audio noise profiles of the audio noise emitted by the plurality of machines and proximity of each machine of the plurality of machines relative to the device.

In another aspect, the present invention embraces Bluetooth Low-Energy technology. In this case the transceiver located on the machine transmits a Bluetooth Low-Energy beacon to the device.

In another aspect, wherein the machine and/or the device are mobile apparatuses.

In another aspect, the machine and the device are operating in an industrial environment.

In another exemplary embodiment, the present invention embraces a method that provides improvements in speech recognition in a high noise environment by intelligently filtering the received audio that comprises audio noise generated by a machine and speech emitted by a user.

The method comprises, at a device, receiving audio via a microphone; receiving a wireless communication signal from a machine; determining an audio noise profile from the wireless communication signal or a database; determining proximity of the device relative to the machine using location information extracted from the wireless communication signal; determining a filter based on the audio noise profile and proximity of the device relative to the machine; filtering the audio utilizing the filter and performing speech recognition processes to the filtered audio. The audio comprises speech emitted from a user and audio noise emitted by the machine.

In another aspect, the method further comprises performing speech recognition processing without filtering the received audio if the device fails to receive a wireless communication signal from the machine, or if the device fails to detect audio noise emitted by the machine, or if the wireless communication signal fails to include location information.

In another aspect of the method, if the device is in an operation mode for listening for speech and a machine identification (ID) obtained from the wireless communication signal identifies in the database the audio noise profile associated with the machine ID, the device retrieves the audio noise profile from the database in order to determine the filter.

In another aspect of the method, if the device is in an operation mode for recording profiles and the wireless communication signal includes a machine identification (ID), the device generates a new audio noise profile based on the machine ID and the received audio noise. The generated new audio noise profile is transmitted to the machine and/or stored in the database for future processing. In the operation mode for recording profiles, one or more audio noise profiles are generated automatically.

In another aspect of the method, the database is either located in the device or located in another device That is, the database may be a component of the device, or the audio noise profile and associated machine ID information may be transferred and stored in another device in the network.

In another aspect of the method, if the wireless communication signal comprises a machine ID and a first audio noise profile, and if the device stores a second audio noise profile associated with the machine ID in the database, then select the first audio noise profile or the second audio noise profile to determine the filter based in part on a latest time stamp of the respective profiles. Moreover, if the device does not store a second audio noise profile associated with the machine ID in the database, then select the first profile to determine the filter.

In another aspect of the method, if a plurality of machines is within a defined proximity of the device, the device determines the characteristics of the filter based, in part, on collective audio noise profiles of the audio noise emitted by the plurality of machines and proximity of each machine of the plurality of machines relative to the device.

In yet another exemplary embodiment, A computer readable apparatus comprising a non-transitory storage medium storing instructions for providing speech recognition in an audio noise environment, the instructions, when executed on a processor, cause a device to: receive audio via a microphone; receive a communication signal from a machine; determine an audio noise profile from the communication signal or a database; determine proximity of the device relative to the machine using location information extracted from the communication signal; determine a filter based on the audio noise profile and proximity of the device relative to the machine; and filter the audio utilizing the filter and perform speech recognition processes to the filtered audio. The audio comprises speech emitted from a user and audio noise emitted by the machine.

In another aspect for the non-transitory computer readable storage medium embodiment, the communication signal is a Bluetooth Low-Energy beacon.

In another aspect for the non-transitory computer readable storage medium embodiment, if the communication signal comprises a unique identifier of the machine, the device, in a recording mode, generates a new audio noise profile based on the unique identifier and the audio noise emitted by the machine.

In another aspect for the non-transitory computer readable storage medium embodiment, if a plurality of machines is within a defined proximity of the device, the device determines the characteristics of the filter based, in part, on collective audio noise profiles of the audio noise emitted by the plurality of machines and proximity of each machine of the plurality of machines relative to the device.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; D702,237; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;

U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;

U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILEPHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTOCONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method, comprising:
   at a device:
      receiving audio via a microphone of the device, wherein the audio comprises speech emitted from a user and audio noise emitted by a plurality of machines;
      receiving a wireless communication signal from each of the plurality of machines;
      determining a plurality of audio noise profiles based on the wireless communication signals;
      determining proximity of the device relative to each of the plurality of machines using location information extracted from respective wireless communication signals;
      in response to detecting that the device is in proximity of the plurality of machines, generating a filter based on the plurality of audio noise profiles, wherein a characteristic of the filter is based on the proximity of the device relative to each of the plurality of machines; and
      filtering the audio using the filter.

2. The method according to claim 1, further comprising:
generating, for each of the plurality of machines, a new audio noise profile based on a unique identifier and audio noise emitted by a machine in a recording profile mode, if a respective wireless communication signal comprises the unique identifier of the machine.

3. The method according to claim 2, wherein the new audio noise profile is transmitted to the machine and/or is stored in a database.

4. The method according to claim 2, wherein, in the recording profile mode, one or more audio noise profiles are generated automatically.

5. The method according to claim 1, further comprising:
determining, for each of the plurality of machines, the location information of a machine by measuring an output power level of a respective wireless communication signal at an output of the machine.

6. The method according to claim 1, further comprising:
determining, for each of the plurality of machines, the proximity of a machine relative to the device by comparing an output power level of a respective wireless communication signal measured at the machine to a received power level of the respective wireless communication signal measured at the device.

7. The method according to claim 1, further comprising:
performing speech recognition processes without filtering the audio, if the device fails to detect the wireless communication signals transmitted from the plurality of machines, or if the device fails to receive audio noise emitted by the plurality of machines, or if the wireless communication signals do not include the location information for the plurality of machines.

8. The method according to claim 1, wherein, the plurality of machines and/or the device are mobile apparatuses.

9. The method according to claim 1, further comprising:
performing speech recognition processes to the filtered audio.

10. The method according to claim 1, wherein, the wireless communication signal is a Bluetooth Low-Energy beacon.

11. The method according to claim 1, comprising:
receiving machine identifications (IDs) from one or more of the plurality of machines, wherein the machine IDs are received when the device is in an operation mode, and wherein the machine IDs are contained in the wireless communication signals;
determining whether an audio noise profile associated with each of the received machine IDs is stored in a database; and
retrieving the audio noise profile associated with each of the received machine IDs from the database.

12. The method according to claim 11, further comprising:
generating a new audio noise profile based on a machine ID and the audio noise received from a machine associated with the machine ID.

13. The method according to claim 12, wherein the generated new audio noise profile is transmitted to the machine and/or is stored in the database.

14. The method according to claim 11, wherein in the operation mode, one or more audio noise profiles are generated automatically.

15. The method according to claim 11, wherein,
if a wireless communication signal comprises a machine identification (ID) and a first audio noise profile, the method further comprising:
selecting the first audio noise profile or the second audio noise profile to generate the filter based in part on a latest timestamp of the selected audio noise profile, if the device stores a second audio noise profile associated with the machine ID in the database, and
selecting the first profile to determine the filter, if the device does not store a second audio noise profile associated with the machine ID in the database.

16. A device comprising:
a microphone; and
a transceiver,
wherein the device is configured to:
receive, via the microphone, an audio comprising speech emitted from a user and audio noise emitted by a plurality of machines;
receive, via the transceiver, a wireless communication signal from each of the plurality of machines;
determine a plurality of audio noise profiles based on the wireless communication signals;
determine proximity of the device relative to each of the plurality of machines based on location information extracted from respective wireless communication signals;
in response to detecting that the device is in proximity of the plurality of machines, configure a filter based on the plurality of audio noise profiles, wherein a filter characteristic of the filter is based on a proximity level of the proximity of the device relative to each of the plurality of machines; and
filter the audio using the configured filter.

17. The device of claim 16, further configured to:
generate, for each of the plurality of machines, a new audio noise profile based on a unique identifier and the audio noise emitted by a machine, if a respective wireless communication signal comprises the unique identifier of the machine.

18. The device of claim 16, further configured to:
determine, for each of the plurality of machines, the location information of a machine by measuring an output power level of a respective wireless communication signal at an output of the machine.

19. The device of claim 16, further configured to:
determine, for each of the plurality of machines, the proximity of a machine relative to the device by comparing an output power level of a respective wireless communication signal measured at the machine to a received power level of the respective wireless communication signal measured at the device.

20. The device of claim 16, further comprising a speech recognition module configured to perform speech recognition processes to the filtered audio.

* * * * *